United States Patent [19]

Pryor

[11] 4,383,801
[45] May 17, 1983

[54] WIND TURBINE WITH ADJUSTABLE AIR FOILS

[76] Inventor: Dale H. Pryor, P.O. Box 4578, Odessa, Tex. 79760

[21] Appl. No.: 239,218

[22] Filed: Mar. 2, 1981

[51] Int. Cl.³ .............................................. F03D 7/06
[52] U.S. Cl. ........................................ 416/17; 416/24; 416/119
[58] Field of Search .................. 416/17, 24, 119, 1, 416/108, 112 A

[56] References Cited

U.S. PATENT DOCUMENTS

| | | | |
|---|---|---|---|
| 1,964,347 | 6/1934 | Ford | 416/119 |
| 4,052,134 | 10/1977 | Rumsey | 416/119 |
| 4,137,009 | 1/1979 | Telford | 416/119 X |
| 4,247,251 | 1/1981 | Wuenscher | 416/119 X |
| 4,260,328 | 4/1981 | Hamel | 416/17 |
| 4,278,894 | 7/1981 | Ciman | 416/108 X |
| 4,282,944 | 8/1981 | Trumpy | 416/119 X |
| 4,286,922 | 9/1981 | Lew | 416/17 |

FOREIGN PATENT DOCUMENTS

| | | | |
|---|---|---|---|
| 732666 | 3/1943 | Fed. Rep. of Germany | 416/118 |
| 505764 | 8/1920 | France | 416/17 |
| 915892 | 11/1946 | France | 416/17 |
| 2029909 | 3/1980 | United Kingdom | 416/24 |

Primary Examiner—Everette A. Powell, Jr.
Attorney, Agent, or Firm—Marcus L. Bates

[57] ABSTRACT

A wind turbine has axially aligned, spaced, rotatable support flanges with a plurality of vertically aligned air foils having opposed ends journaled thereto. The air foils are pivoted respective to the wind by a pitch flange mounted eccentrically respective to the support flanges. The pitch flange moves the air foils into an aligned relationship respective to the wind to optimize the energy derived from the blowing wind.

9 Claims, 11 Drawing Figures

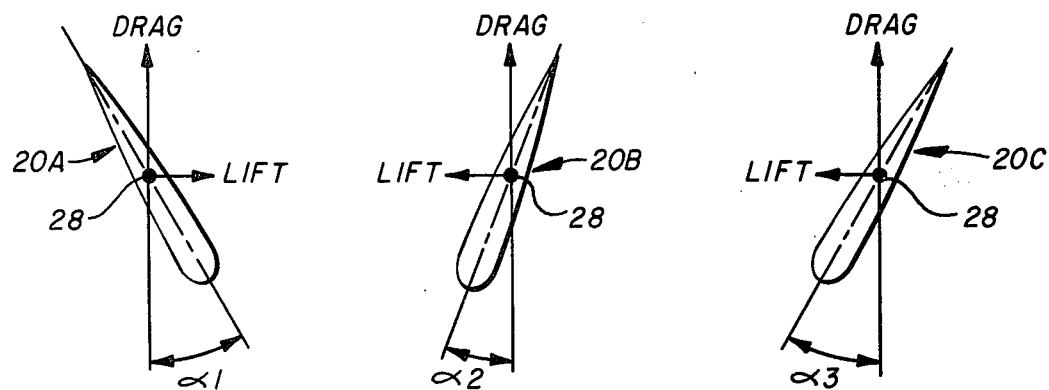
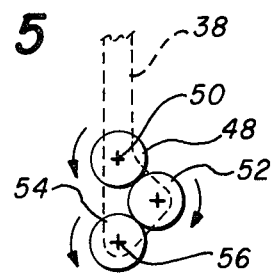
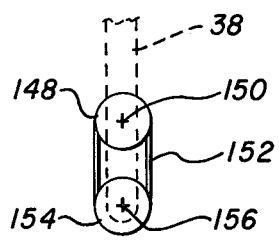
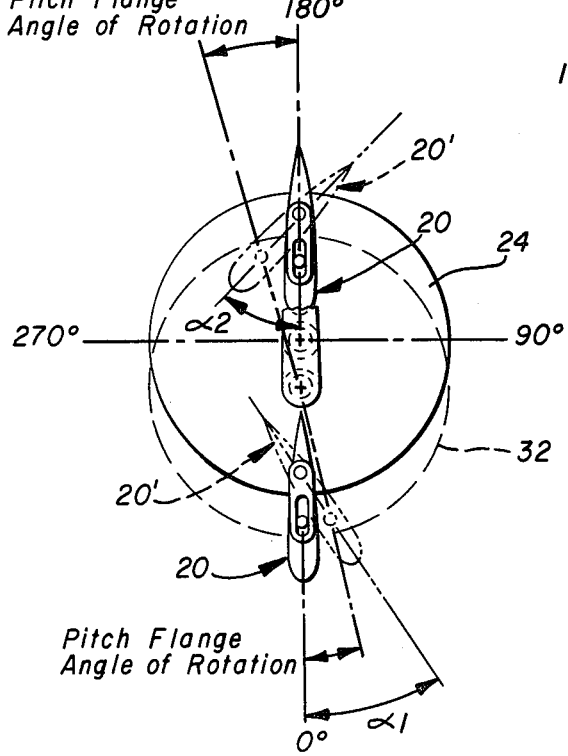

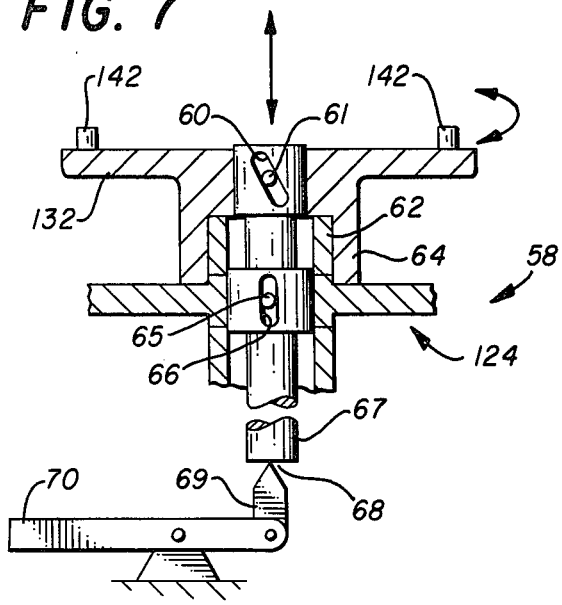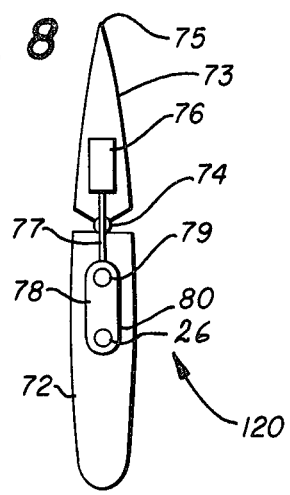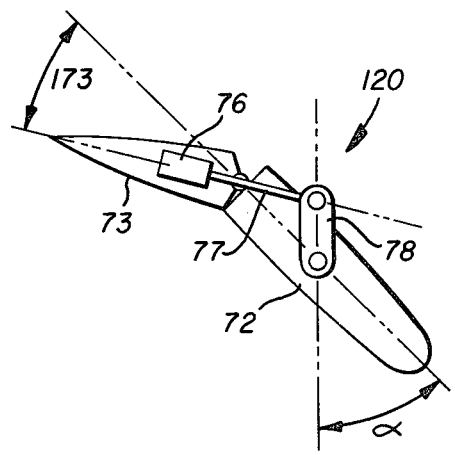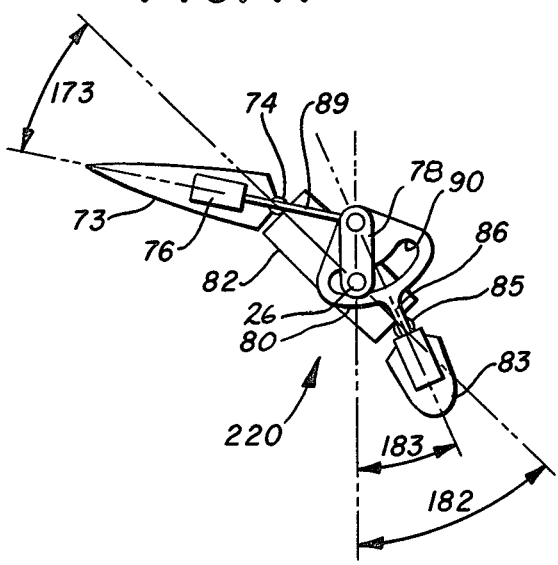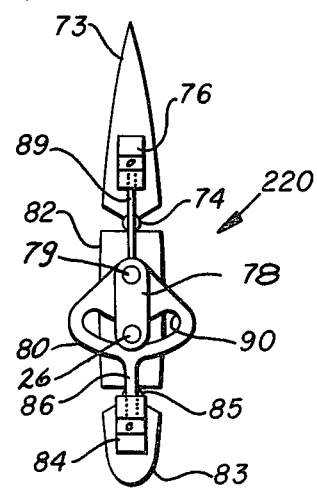

WIND TURBINE WITH ADJUSTABLE AIR FOILS

BACKGROUND OF THE INVENTION

Windmills offer many advantages over other forms of power conversion devices. The cost of the power derived from the wind is usually proportional to the cost of maintenance of the windmill and accessories. In areas where the wind velocity is of a considerable magnitude during most of the year, the windmill provides independence, which in itself is a valuable and tangible reward and is easily worth the expenditure of the time required for the maintenance of the windmill apparatus.

Most windmills have a wheel, which includes a plurality of fixed pitch, radially spaced blades. The blades therefore must be set at an angle which represents a compromise between the wind blowing at a low velocity and at a high velocity. Various ingenius apparatus have been suggested in the past which can be employed to save the mill structure during winds of excessive velocity.

There are several disadvantages inherent in the design of a horizontal axis windmill of the type having radially arranged fixed blades. The wind gradient and the fixed pitch of the blades represent some of the most outstanding problems. The wind gradient in many parts of the country is a much greater problem than is realized by many mill mechanics. The wind forces simultaneously acting on the upper and lower marginal ends of the wheel often is many times greater on the upper end of the wheel as compared to the lower end thereof. The wind gradient therefore produces a large force differential on the blades, and this imbalance must be reckoned with in designing a large horizontal axis windmill.

A vertical axis windmill or turbine has many advantages over the horizontal axis windmill. In the vertical axis windmill, the wind gradient is less significant, the entire turbine assembly is more easily supported, and damage due to high velocity winds is more easily controlled. However, where the vertical axis rotor or wind turbine incorporates fixed pitch blades, there still must be a compromise by which the blade pitch is selected. Moreover, on many vertical axis turbines, the blades are effective for delivery of power only for a portion of the circumference of the rotating turbine wheel; and, in fact, a marginal circumferential length of the turbine may have blades which work in opposition to the other blades which are extracting power from the wind.

A vertical axis wind turbine which overcomes many of the above problems is the subject of this invention.

SUMMARY OF THE INVENTION

A vertical axis wind turbine having a plurality of air foils journaled to spaced upper and lower axially aligned flanges. The flanges are journaled to a common support member and rotate when sufficient wind pressure gradient is effected across the blades.

The pitch of the air foils is changed by a pitch flange set eccentric to the support flanges. The pitch flange rotates with and forms part of the turbine, and moves respective to the upper and lower flanges in order to change the pitch of the air foil.

A wind vane is journaled to the wind turbine main support member and moves the pitch flange, which in turn pivotally moves each of the air foils, thereby orienting the air foils respective to the wind direction such that the angle of attack of the air foils extracts energy from the wind.

Apparatus is included by which the relative position of the pitch flange is changed, thereby changing the pitch of the air foils, which in turn controls the rotational speed of the turbine.

Accordingly, a primary object of the present invention is the provision of a method for extracting energy from surface winds by a vertical axis turbine having means by which the pitch of the individual air foils thereof is continuously changed as the turbine rotates the air foil, or vice versa.

Another object of the present invention is the provision of a wind turbine having a vane by which an eccentric means continually adjusts the angle of attack of a plurality of air foils as the air foils rotate about the central axis of the turbine.

A still further object of the present invention is the provision of a wind turbine device having vertically arranged variable pitch air foils which are continuously adjusted to maintain an optimum angle of attack as the air foils rotate about a center.

Another and still further object of the present invention is the provision of improvements in a vertical axis wind turbine apparatus having vertically oriented air foils which are maintained oriented at the optimum angle of attack respective to the direction of the wind so that a maximum amount of power is extracted from the wind.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 3 is a diagrammatical representation of a top view of part of the apparatus disclosed in the foregoing figures for purposes of discussion;

FIG. 4 is a diagrammatical representation of a top view of the apparatus disclosed in FIGS. 1 and 2;

FIG. 5 is an isolated, diagrammatical representation of part of a modification of the apparatus disclosed in the foregoing figures;

FIG. 6 sets forth another modification of the apparatus disclosed in the foregoing figures;

FIG. 7 is an isolated, enlarged, detailed view of part of the apparatus made in accordance with the present invention; and, FIGS. 8–11 set forth a top view of various different modifications of air foils which may be used in conjunction with a wind turbine made in accordance with the present invention.

DETAILED DESCRIPTION OF THE PREFERRED EMBODIMENTS

Figure 1:
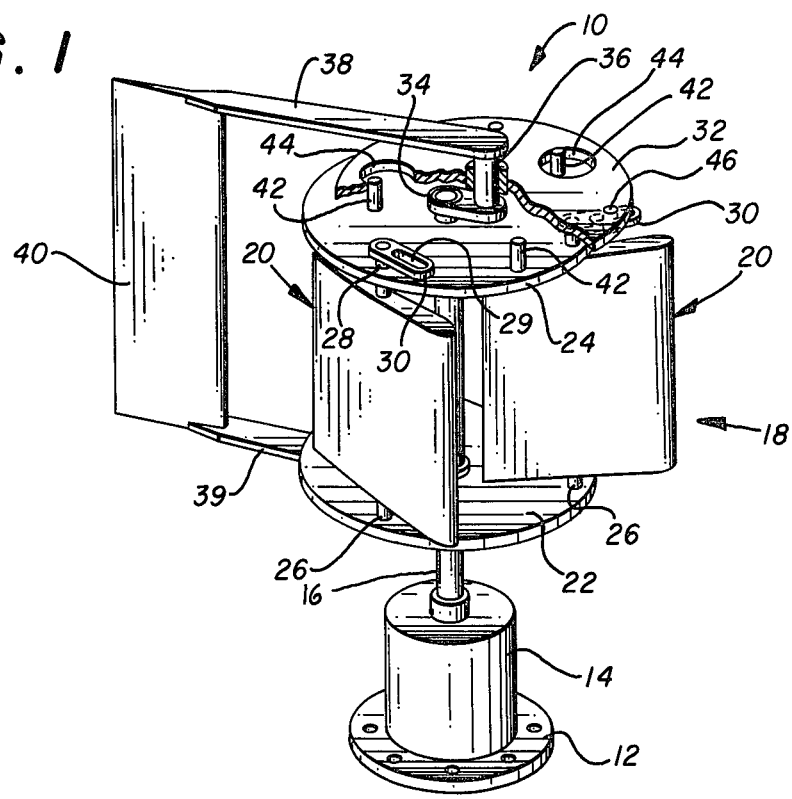
FIG. 1 is a perspective view of a wind turbine made in accordance with the present invention, with some parts thereof being broken away therefrom, and some of the remaining parts being shown in cross-section.

FIG. 1 discloses a wind turbine apparatus 10 rotatably supported from a fixed mount 12 so that work can be performed by a generator 14, or the like, by rotation of a central power shaft 16. The turbine assembly 18 comprises a plurality of variable pitch blades, or air foils, 20. The air foils are journaled between a lower drive flange 22, which is affixed to the shaft 16, and an upper drive flange 24 which is spaced from the lower flange. Each air foil includes a vertically disposed blade mounting shaft having opposed ends 26 and 28 which are received in journaled relationship respective to the lower and upper flanges. Slot 29 is formed within a pitch control crank 30, which in turn is affixed to the upper terminal end of the upper blade mounting shaft 28.

A pitch flange 32 is eccentrically supported respective to the terminal end 34 of the central power shaft 16. The pitch flange is journaled to a vane crank 36, and the vane crank is connected to an upper trailing boom 38 which supports a vane 40. A lower trailing boom 39 is journaled to shaft 16 at a location below the plate member or lower drive flange 22.

A plurality of pins 42 are received within a plurality of pin drive holes 44 which are formed within the pitch flange so that the pitch flange is forced to rotate eccentrically respective to the upper flange. Pin 46 is affixed to the pitch flange and downwardly depends therefrom and into captured relationship respective to the pitch control slot 29. Hence, the upstanding pins 42 drive the pitch flange while the downwardly directed pins 46 position the crank 30 which changes the pitch of the air foils.

Figure 2:
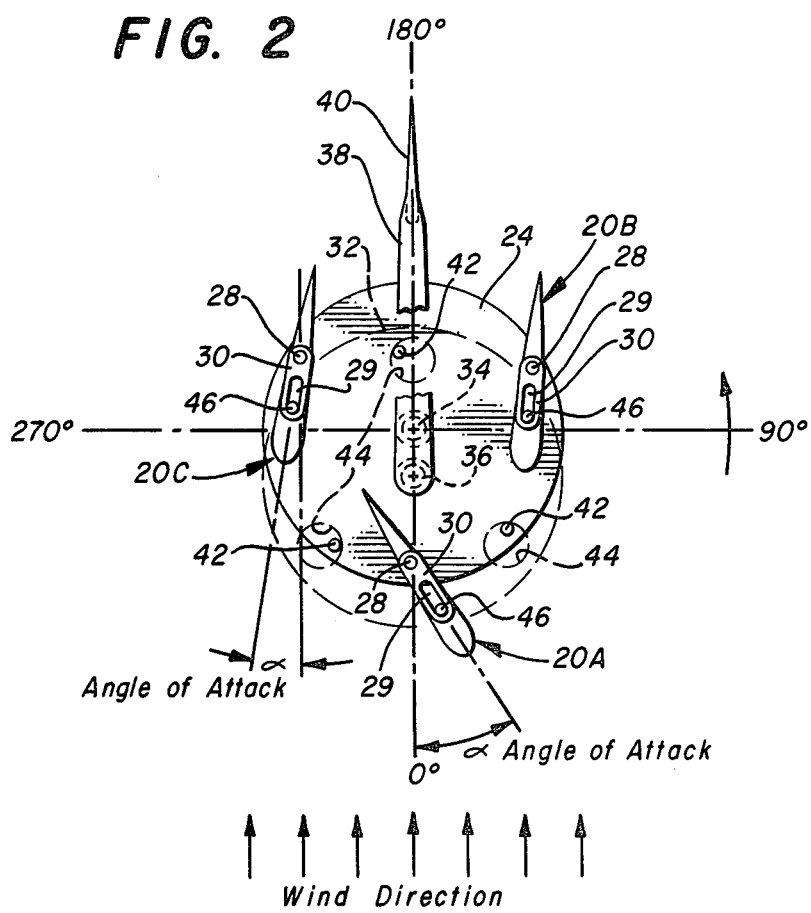
FIG. 2 is a fragmentary, top, plan view of the turbine seen in FIG. 1.

In FIGS. 1 and 2 of the drawings, the wind turbine includes three air foils 20A, 20B, and 20C. Each of the pin drives 42 is received within a pin drive hole 44 so that rotation of the flanges imparts rotational motion into the eccentrically mounted pitch flange. As the pitch flange moves eccentrically respective to the upper drive flange, the pitch control slot of the crank is moved continually to impart a change into the pitch of each air foil, for example, from $\alpha 1$ to $\alpha 2$, as noted in FIGS. 2–4.

In FIG. 5, gear 48 is attached to the power shaft at 50 and drives idler gear 52 in the indicated direction of rotation. The idler gear drives gear 54 which is attached to drive the pitch flange. The driving gears and the driven gears or sprockets must be of equal size in order to keep a 1:1 ratio.

FIG. 6 illustrates a pulley 148 connected to the power shaft at 150, and an endless belt or chain drive 152 which drives sprocket or sheave 154. The sheave 154 is journaled at 156 and is attached to the pitch flange in the same manner set forth in FIGS. 1, 2, and 5.

FIG. 7 illustrates a pitch control which is advantageously employed for changing the pitch of the air foils of the turbine apparatus. The pitch flange 132 is journaled to a central boss having an inclined slot 60 within which a lateral pin 61 is slidably received. Bushing 62 is received within a sleeve 64 for providing low friction rotational motion between the illustrated central support shaft. Pin 66 is received within slot 66 which is arranged perpendicularly to the axial centerline of shaft 67. The lower end 68 of the shaft bears against an actuator 69 which is moved by a control lever 70.

Accordingly, movement of lever 70 rotates pitch flange 132 respective to the upper drive flange 124, thereby changing the range or set point within which the air foils pivot as they are rotated by the drive plate and pin.

FIGS. 8 and 9 illustrate apparatus for changing the shape of the air foils 120 during rotation of the turbine in order to increase the lift and consequently the torque and rpm of the apparatus. The air foil leading edge 72 is hinged at 74 to a trailing edge flap 73. The flap terminates at 75. Flap guide cylinder 76 reciprocatingly receives the end of flap actuator arm 77 therewithin, with the marginal end of the arm preferably being in the form of a piston. Flap crank 78 is affixed to the air foil shaft 26 with the end of arm 77 being journaled at 79 to the end of the flap crank. As seen in FIG. 9, as the pitch flange changes the pitch $\alpha$ of the air foil, the shape of the air foil changes in the illustrated manner to provide additional lift as indicated by the angle 173.

In FIGS. 10 and 11, the air foil 220 is provided with both an adjustable flap and an adjustable leading edge for providing still additional lift. A slotted bell crank 80 is journaled at 79 to the flap crank 78. The air foil includes a leading edge 83 having a cylinder 84 which reciprocatingly receives the marginal free end of an arm 86 therewithin. The leading edge is hinged at 85 to the main center section 82 of the air foil. The slotted bell crank includes an arcuate slot 90 which captures the blade mounting shaft 26 therewithin.

The leading edge 83 can also be in the shape of a slat if desired so that the slat not only changes the effective angle of attack but also changes the air flow over the air foil to improve the air flow across the main air foil.

The present invention discloses a wind turbine which comprises a plurality of air foils supported between two spaced support flanges which are connected to a central shaft. The air foils pivot in the flanges, and are connected by a pitch crank to a third rotating flange, referred to herein as a pitch flange. The pitch flange is set eccentric to the support flanges. The pitch flange rotates at the same speed as the air foil assembly by means of a belt, chain, or pin drive. The eccentric is attached to a wind vane which properly orients the air foils respective to the wind direction to provide optimum power extraction from the blowing wind. Each air foil, as it rotates 360° about the power shaft, is pivotally aligned by the pitch flange to encounter the blowing wind in a manner to effect the maximum lift and minimum drag for the apparatus.

As illustrated in FIGS. 1 and 2, the wind vane maintains the pitch flange advanced upwind of the support flanges, noting the relative position of journals 34 and 36. The rotating air foils are pivotally moved by the pitch flange into the illustrated positions of FIG. 2. As further rotation occurs, the drive and pitch flanges rotate in the same direction and at the same speed. This action causes the air foils to change their angle of attack as they rotate about the central or power shaft. As an air foil approaches the 90° position, the angle of attack decreases to 0° or "feather" position. As the air foil continues toward the 180° position, the angle of attack increases in the opposite direction, as seen at 20' in FIG. 4 and $\alpha 2$ in FIG. 3. At the 270° position, the angle of attack again passes through 0° and begins increasing to the position shown at the 0° position, completing the cycle.

FIG. 3 shows the resultant forces effected on each air foil when they are in the position shown in FIG. 2. FIG. 4 shows change in pitch as the pitch flange is moved by the drive flanges. From the above analysis, it can readily be seen that a torque is produced.

The apparatus of FIG. 7 enables the angle of attack to be changed to "feather" the air foil or to increase the angle of attack. This feature may be used to stop the turbine, as well as for speed and torque control. This is accomplished by moving the pitch flange angle relative to the wind vane around its own center. FIG. 4 shows what happens when the pitch flange angle is changed. At 0°, the air foils regardless of position, are "feathered". By pivoting the pitch flange counterclockwise, the air foil at position 0° is moved counterclockwise, thereby placing the angle of attack at a value to cause rotation of the drive flange in a counterclockwise direction. The air foil shown at 180° is pivoted in a clockwise direction, changing the angle of attack in a direction to cause rotation of the drive flange to occur in the counterclockwise direction. Therefore speed and consequently torque can be changed from 0 to a maximum value by controlling the angle of the pitch flange in relation to the wind vane. It can be shown that at the 90° and 270° positions, the air foils are at or near 0° angle of attack regardless of the position of the pitch flange.

FIGS. 5 and 6 show various methods of driving the pitch flange from the drive flange. The driver and driven gears, sprockets, or sheaves must be of equal size in order to keep a 1:1 ratio. The pin drive is not a constant velocity drive, however, the slight variation in the angle between the drive and pitch flanges has no appreciable effect on the final performance of the wind turbine.

In order to change the relative position of the pitch flange while the system is rotating, it is necessary to provide a device to change the relationship of the pitch flange with respect to the drive flange which changes the relative position of the pitch flange in relation to the wind vane. One device which accomplishes this operation is shown in FIG. 7.

In FIGS. 8–11, there is disclosed a method for changing the shape of the air foil during rotation to increase the lift and consequently the torque and rpm. The apparatus of FIGS. 8 and 9 illustrate a trailing edge flap, which may produce twice the lift as a basic air foil. The basic air foil is split toward the trailing edge and hinged at 74. The flap is also attached to the air foil pivot through a flap crank, flap rod, and flap guide cylinder.

FIG. 9 shows the air foil as the angle of attack is changed. The flap crank remains parallel to the main eccentric crank. This forces the flap to proceed to a flap angle as shown. The flap rod slides in the guide cylinder providing the necessary forces and motion to accomplish the above. If the angle of attack is reversed, the flap angle is also reversed. It should be noted that the guide cylinder can also be placed at the pivot point on the flap crank instead of as shown.

As seen in FIGS. 10 and 11, the leading edge may be modified as shown for providing additional lift. This leading edge is hinged as shown in the drawings, and greatly increases the lift of the air foil.

I claim:

1. A wind turbine having a drive shaft disposed along a vertical axis; a lower and an upper drive flange vertically spaced from one another; rotatably means mounting said drive flanges respective to said shaft; a plurality of air foils; means by which the opposed ends of said air foils are journaled to said drive flanges to enable the air foils to be moved from a high lift to a low drag configuration respective to any wind which may blow thereacross;

a pitch flange eccentrically mounted respective to the drive flanges, a trailing boom, a vane supported by said trailing boom, said boom is supported by said shaft, means connecting said drive flanges, said pitch flange, and said vane to cause said pitch flange to rotate eccentrically with respect to said drive flanges and describe a circle thereabout;

linkage means interconnecting said air foils to said pitch flange in a manner to continually change the pitch of the air foil respective to the vane as the drive flanges are rotated 360° about the drive shaft to cause the air foils to always be oriented in a maximum lift, minimum drag configuration.

2. The wind turbine of claim 1 wherein said pitch flange is located in spaced relationship respective to one of said drive flanges;

said trailing boom is connected to a journal which is arranged in eccentric relationship respective to the axis of the drive flanges; said pitch flange being rotatably received by said journal thereby achieving the recited eccentric relationship with respect to the drive flanges.

3. The wind turbine of claim 2 wherein said pitch flange includes drive holes formed therein; one side drive flange has drive pins affixed thereto and extending into said drive holes, whereby the pitch flange is drivingly captured by the drive flange.

4. The wind turbine of claim 3 wherein said air foils are circumferentially spaced about said drive shaft;

each of said air foils include a trailing edge flap; and crank means by which said flap is moved in response to the pitch flange changing the pitch of the air foil.

5. In a wind turbine having a power shaft, a drive flange supported by said power shaft, and a plurality of circumferentially spaced air foils having opposed ends, with one end being rotatably supported by the drive flange; the improvement comprising:

a wind vane journaled to said drive shaft for pivotal movement in a plane perpendicular to the shaft, a pitch flange, means by which the pitch flange is journaled eccentrically respective to the drive shaft; means by which the pitch flange journal is oriented respective to the wind vane to always maintain the same relative position between the shaft, vane, and pitch flange;

means by which rotation of said drive flange imparts rotational motion into said pitch flange; means by which said air foils are pivotally attached to the drive flange to enable the air foils to be pivotally moved respective to one another and to the drive flanges;

means by which said pitch flange continually moves each air foil into a position of maximum lift and minimum drag; and, means by which said vane orients the pitch flange respective to the drive flange such that the eccentricity of the pitch flange orients the air foil into a position which extracts energy from the wind blowing thereacross.

6. The wind turbine of claim 5 wherein said pitch flange is located in spaced relationship respective to said drive flange;

said wind vane includes an arm which supports a journal in eccentric relationship respective to the axis of the drive flange; said pitch flange being rotatably received by said journal.

7. The wind turbine of claim 5 wherein said pitch flange includes drive holes formed therein; said drive flange has drive pins affixed thereto and extending into said drive holes, whereby the pitch flange is drivingly captured by the drive flange.

8. The wind turbine of claim 5 wherein means are provided for changing the set point of the relationship of the pitch flange respective to the drive flanges.

9. The wind turbine of claim 7 wherein each of said air foils include a trailing edge flap; and crank means by which said flap is moved in response to the pitch flange changing the pitch of the air foil.

* * * * *